(12) United States Patent
Schwarz et al.

(10) Patent No.: US 9,440,374 B2
(45) Date of Patent: Sep. 13, 2016

(54) DEVICE AND METHOD FOR PRODUCING POLYMER AGGLOMERATES

(75) Inventors: Raimund Schwarz, Goslar (DE); Stephan Poller, Bochum (DE); Markus Brunkau, Niestetal (DE); Thomas Schill, Berkatak (DE); Dick Van Dijk, Kent (GB)

(73) Assignee: Zeppelin Systems GmbH (DE)

( * ) Notice: Subject to any disclaimer, the term of this patent is extended or adjusted under 35 U.S.C. 154(b) by 554 days.

(21) Appl. No.: 13/990,544

(22) PCT Filed: Mar. 3, 2011

(86) PCT No.: PCT/EP2011/053166
§ 371 (c)(1),
(2), (4) Date: Oct. 17, 2013

(87) PCT Pub. No.: WO2012/072275
PCT Pub. Date: Jun. 7, 2012

(65) Prior Publication Data
US 2014/0027937 A1    Jan. 30, 2014

(30) Foreign Application Priority Data
Nov. 30, 2010    (DE) .................. 10 2010 060 911

(51) Int. Cl.
*B29B 9/08*    (2006.01)
*B01J 2/10*    (2006.01)
(Continued)

(52) U.S. Cl.
CPC .. *B29B 9/08* (2013.01); *B01J 2/10* (2013.01); *B29B 9/14* (2013.01); *B29C 47/0019* (2013.01);
(Continued)

(58) Field of Classification Search
CPC .................................. B29B 9/08; B01J 2/10
USPC .................................. 425/6, 222; 264/5, 117
See application file for complete search history.

(56) References Cited

U.S. PATENT DOCUMENTS

| 5,938,994 A | 8/1999 | English |
|---|---|---|
| 6,479,002 B1 | 11/2002 | Becker |
| 2009/0023851 A1 | 1/2009 | Bierdel |

FOREIGN PATENT DOCUMENTS

| CH | 632939 | 11/1986 |
|---|---|---|
| DE | 1262293 | 3/1968 |

(Continued)

OTHER PUBLICATIONS

EPO machine translation of CH 632939, retrieved May 12, 2016.*

*Primary Examiner* — Timothy Kennedy
(74) *Attorney, Agent, or Firm* — Smith, Gambrell & Russell

(57) ABSTRACT

The invention relates to a device (1) for producing polymer agglomerates, comprising a compounder (2) having a housing (21) and a twin screw (22) arranged therein as well as a plurality of material inlets (3, 4) for admission of a polymer and additives, tempering units for heating the mix comprising polymer and additives, at least one degassing unit (5) and an outlet (23) and an agglomerating vessel (11) having an agglomerating tool (8) and a cooling tool (10). The agglomerating vessel (11) is connected via a connection channel (6) to the outlet (23) of the compounder (2), wherein the twin screw (22) of the compounder (2) is designed as a co-rotating twin Screw (22) and the agglomerating tool (8) of the agglomerating vessel (11) is arranged in the fall direction of the mix below the connection channel (6) and comprises mutually engaging rotors (81) and stators (82) for producing agglomerates of defined particle size. The invention further relates to a method for producing polymer agglomerates.

7 Claims, 4 Drawing Sheets

Figure 1:
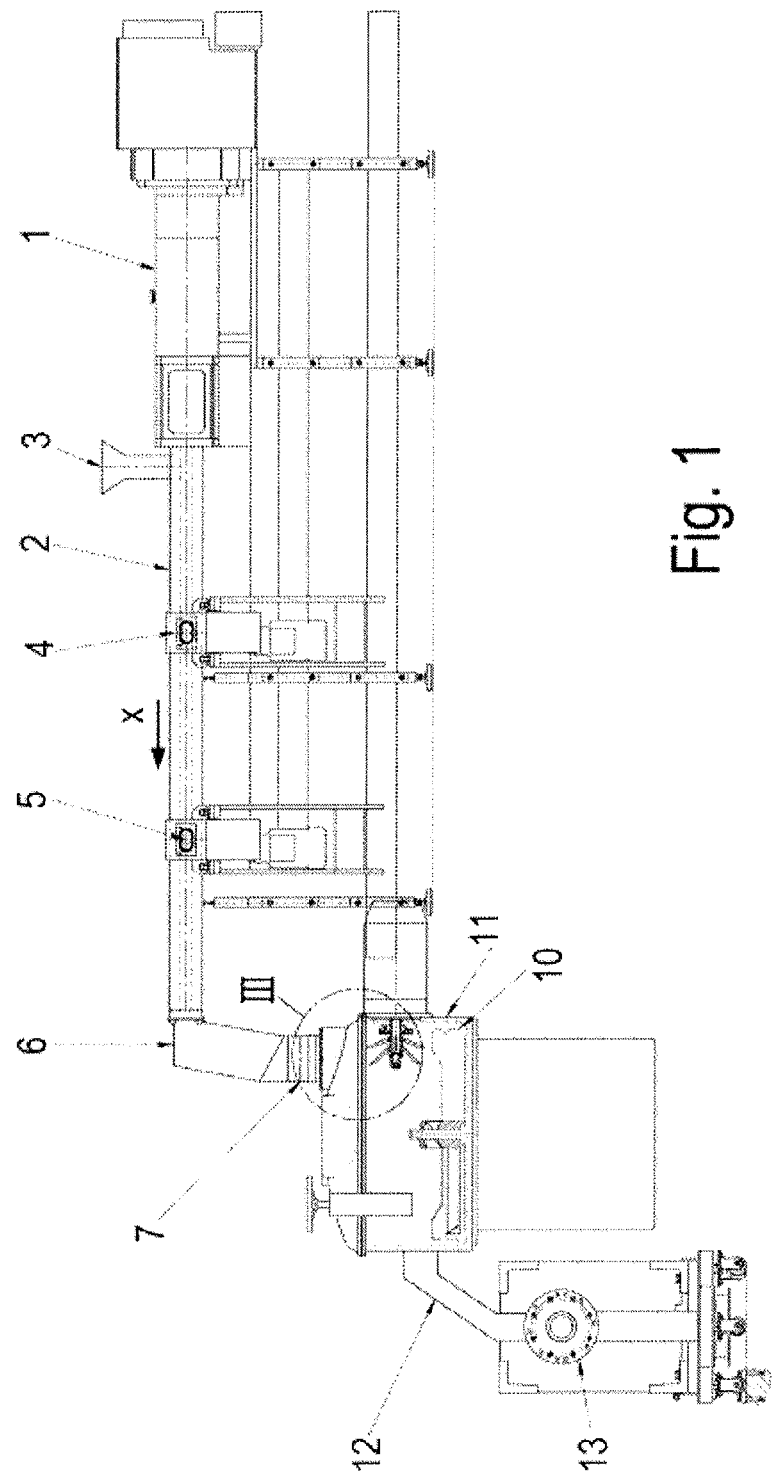

(51) Int. Cl.
*B29B 9/14* (2006.01)
*B29C 47/00* (2006.01)
*B29C 47/36* (2006.01)
*B29C 47/60* (2006.01)
*B29C 47/38* (2006.01)
*B29C 47/40* (2006.01)

(52) U.S. Cl.
CPC ......... *B29C 47/366* (2013.01); *B29C 47/6031* (2013.01); *B29C 47/38* (2013.01); *B29C 47/402* (2013.01)

(56) References Cited

FOREIGN PATENT DOCUMENTS

| | | |
|---|---|---|
| DE | 19860836 | 5/2000 |
| DE | 102007029008 | 12/2008 |
| EP | 1829660 | 9/2007 |
| WO | WO2009/054262 | 4/2009 |

\* cited by examiner

Along A-A

DEVICE AND METHOD FOR PRODUCING POLYMER AGGLOMERATES

CLAIM OF PRIORITY

This application is the National Stage filing under 35 U.S.C. 371 of International Patent Application No. PCT/EP2011/053166, filed on Mar. 3, 2011, which claims priority from German Application No. 10 2010 060 911.0, filed on Nov. 30, 2010, all of which are incorporated by reference herein in their entirety.

The present invention relates to a device for producing polymer agglomerates according to the preamble of claim 1 and to a respective method for producing polymer agglomerates.

For producing compounds or polymer agglomerates, it is known from the prior art to use mixing devices referred to as compounders filled with a polymer granulate or with a delivered in the form of a powder, which is conveyed through said compounder, wherein the polymer, as it passes through the compounder, is melted and mixed with additives in the form of additives that influence the material properties of the polymer. The resulting mix leaves the compounder through an outlet in the form of a pasty composition, which is then cooled, for example, with water or air and cut into agglomerates of a predetermined particle size.

It is also known from the prior art to incorporate fiber materials, such as, for example, wood fibers, into a polymer. Thus, DE 198 60 836 C1 describes a method and a device for producing a molded article that has the majority of the component made of a plant material and that comprises a thermoplastic material. In this method, the wood particles are first heated to a maximum of 250° C. and then degassed. In the process, an optimal wetting of the jagged wood surface is to be achieved as a result of the temperature and the dehumidification of the wood through various degassing sequences, as well as due to the elimination of air inclusions. For the purpose of mixing the wood and the plastic, a counter-rotating twin screw extruder is used. However, the latter has the disadvantage that the degassing effectiveness is low and the extruder accordingly has to have very large dimensions in order to achieve the desired residual humidity for the wood.

Co-rotating twin screw extruders, on the other hand, are very well suited for degassing/dehumidifying wood particles. The disadvantage of such a co-rotating twin screw extruder is that said extruder usually operates at much higher shear rates than a counter-rotating twin screw extruder; thus, by using such a co-rotating twin screw extruder, the wood fibers mixed with the plastic in the extruder are shortened. Shortening the wood fibers, however, also entails decreasing the strength of the manufactured molded article.

In order not to shorten the fiber lengths of the wood fibers, it is proposed in DE 1262293 A1 to melt the polymer separately and to add the fibers to the melt extruder subsequently in a later step. As a result, the best possible preservation of the initial fiber lengths is ensured.

The processing of the mixes of the polymer and the natural long fibers is carried out in order to preserve the fiber lengths, using so-called rovings, for example. Studies exist according to which different natural fiber rovings are added directly in the extrusion process (Kristiina Oksman Niska and Aji P. Matew, 10th International Conference on Wood and Biofibre Plastic composites, May 11-13, 2009, Madison USA). In the context of the studies, in a twin screw extruder, the plastic is first melted, and then the natural fiber rovings are supplied. In the process, sisal rovings, for example, are shortened to lengths of 3 to 5.5 mm. Other natural fibers are associated with even greater shortening.

The aim of the present invention is to provide a device and a method for producing polymer agglomerates by means of which the polymer agglomerates can be produced in a process that is easy to handle and gentle on the material and by means of which, particularly in the case of the addition of fiber materials, the initial fiber lengths are largely preserved.

Said aim is achieved by a device for producing polymer agglomerates having the characteristics of claim 1.

The device according to the invention comprises a compounder with a housing and a twin screw arranged therein, a plurality of material inlets for the admission of a polymer and additives, tempering units for heating the mix comprising the polymer and additives, at least one degassing unit, and an outlet, as well as an agglomerating vessel with an agglomerating tool and a cooling tool, wherein the agglomerating vessel is connected by a connection channel to the outlet of the compounder. The twin screw or the compounder here is designed as a co-rotating twin screw; the agglomerating tool of the agglomerating vessel is arranged in the fall direction of the mix below the connection channel, and it comprises mutually engaging rotors and stators for producing the agglomerate of the defined particle size.

Such a device makes it possible to run a continuous process at high throughput and, particularly in the manufacture of polymer agglomerates that are mixed with fiber materials, to largely preserve the original fiber length of the fiber materials.

The device according to the invention comprises the following process steps: First, the compounder is supplied with the polymer and the additives, and then the mix is tempered, mixed and degassed. Next, the mix comprising the polymer and additives is applied continuously and in an unpressurized manner in the form of a pasty composition from the compounder. Subsequently, the mix is conveyed through a connection channel into an agglomerating vessel. In the agglomerating vessel, the pasty composition first falls onto an agglomerating tool by means of which a continuous agglomeration of the mix to an agglomerate of a predetermined particle size occurs. Finally, the resulting agglomerate is cooled, and it is discharged as a finished agglomerate from the agglomerating vessel.

All of these steps allow for a gentle and continuous agglomerate production in the compounder by the use of a co-rotating twin screw and in the agglomerating vessel by the use of a noncutting agglomerating tool. For the discharge of the mix from the compounder, no additional pressure needs to be applied in the compounder. Since the agglomerating tool does not use any cutting tools, a subsequent resharpening of such cutting tools can be omitted.

Advantageous embodiment variants of the invention are the subject matter of the dependent claims.

According to an advantageous embodiment variant of the device according to the invention, the rotors and the stators of the agglomerating tool are so designed that they can be adjusted for the adjustment of the radial and/or axial separations between the rotors and the stators. As a result, the particle size of the agglomerates to be produced can be set in a simple manner.

For the same purpose, it is provided according to an additional advantageous embodiment variant to arrange an eccentrically adjustable supply chute at the end of the connection channel facing the agglomerating vessel, and this nozzle can be used to set the position of impact of the mix with the agglomerating tool. As a result, it is possible to produce various particle sizes of agglomerates without adjusting the agglomerating tool in that the mix impacts with areas of the agglomerating tool, which are set using different separations between the rotors and the stators.

According to an advantageous embodiment variant of the method according to the invention, the mix is heated before the discharge from the compounder to a temperature suitable for the subsequent agglomeration with the agglomerating tool. The temperature is particularly important for preserving the fiber lengths of the fiber material of the fiber material/polymer melt mix. Excessively high temperatures here lead to sticking to the agglomerating tool. In the extreme case, an excessively high temperature leads to carbonization respectively combustion of the fiber material, for example, when said material is made of natural fibers, such as flax, sisal, wood fibers, etc. Excessively low temperatures, on the other hand, lead to a shortening of the fiber lengths by rupturing the mix in the agglomerating tool.

Below, the embodiment examples of the invention are further explained in reference to the drawings in the appendix.

Figure 2:
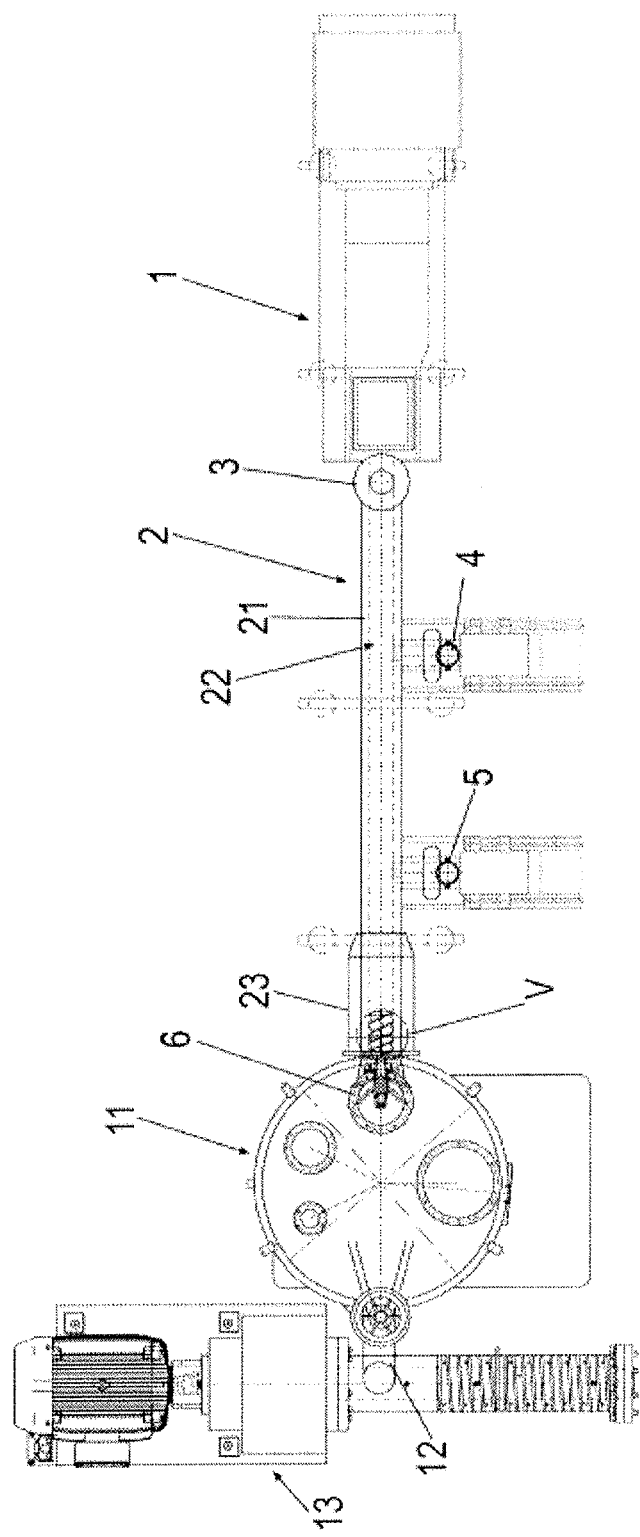
Figure 3:
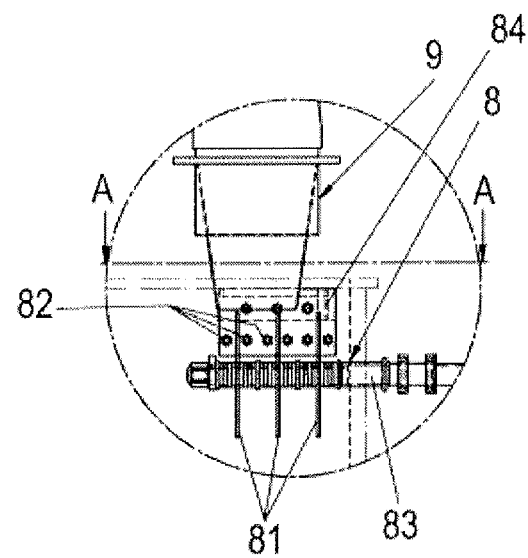
Figure 4:
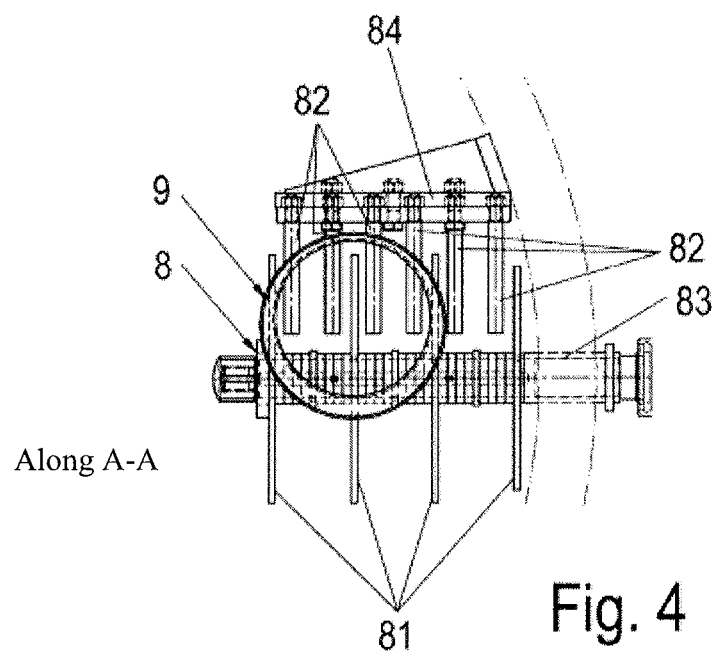
Figure 5:
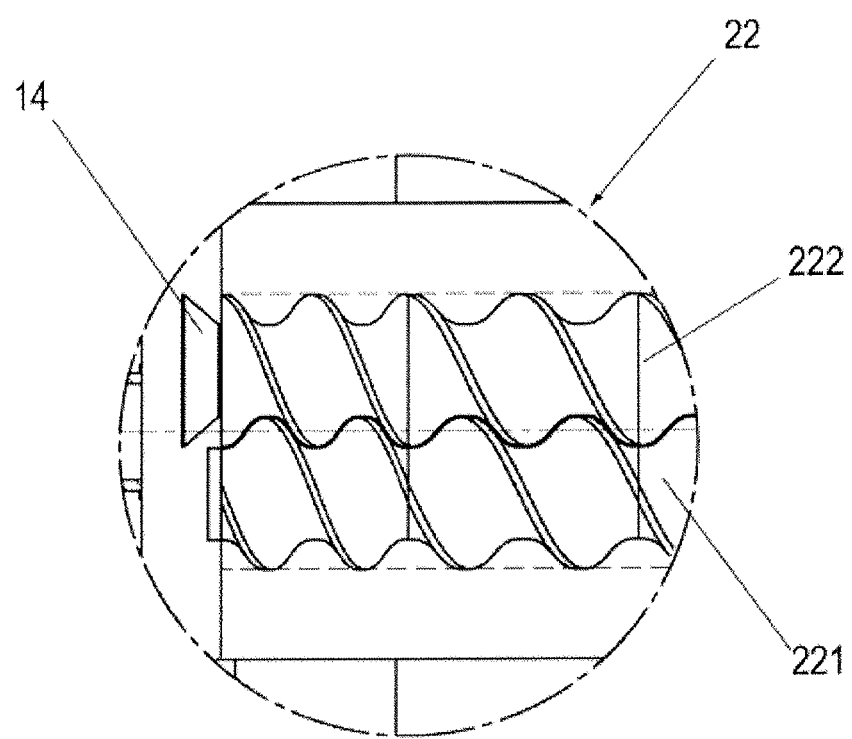

FIG. 1 shows a cross-sectional side view of an embodiment variant of a device according to the invention, FIG. 2 shows a top view of the device of FIG. 1, FIG. 3 shows an enlarged detailed view of the details of the device marked III in FIG. 1, FIG. 4 shows a cross-sectional view through the enlarged detail of FIG. 3 along the line A-A, and FIG. 5 shows an enlarged detailed view of the detail marked V in FIG. 2.

In the subsequent description of the figures, the terms top, bottom, left, right, front, rear, etc. refer exclusively to the selected exemplary representation and position of the compounder, the twin screw and the additional parts in the respective figures. These terms should not be understood to be limiting, i.e., these relations can change as a result of different work positions or the like.

In FIG. 1, the reference numeral 2 denotes the compounder as a whole. The compounder 2 comprises substantially a housing 21 having a co-rotating twin screw 22 arranged therein, which is driven by a drive unit 1, consisting of a motor, a gearbox and a clutch unit, and which substantially corresponds to the one described in DE 10 2006 010 458 A1. The drive unit here is adapted with a view to the setting of the rpm, the torque, and the axial separation by mixing polymers with additives, particularly with fiber materials.

Moreover, the compounder 2 has several material inlets 3 and 4, wherein the polymer, preferably polypropylene, is supplied in the material inlet 3 close to the drive unit 1, and via the feeding screw element of the twin screw 22, it is fed into the interior within the housing 21. Immediately behind the material inlet 3, a first tempering unit is provided for heating the polymer.

Further in the conveyance direction, at least one additional material inlet 4, preferably designed as a side feeder, is provided to supply the compounder with additives. On the one hand, the additives used particularly affect the properties of the polymer.

On the other hand, the fiber material is introduced into the compounder 2 via the material inlet 4 for producing the fiber material-containing polymer agglomerates. Fiber materials here denote in particular natural fibers, glass fibers, carbon fibers, ceramic fibers, metal fibers, and organic or inorganic fibers. It is particularly preferable to use natural fibers, such as wood, flax, hemp or sisal fibers. The compounder is also supplied with the fiber material together with the polymer preferably through the material inlet 3, wherein the individual substances in each case are supplied via a separate dosing unit. The proportion of the fiber materials in the agglomerate here is 10 to 90 wt %, preferably 40 to 80 wt %, and particularly 50 to 75 wt %.

The initial tempering of the polymer/fiber material mix occurs first in such a manner that the polymer temperature is maintained below the melting temperature of the polymer but, nevertheless, sufficiently high in order to optimally design the drying of the wood, particularly when wood fibers are used.

The screw elements of the co-rotating twin screw are low-shear elements as described in the above-mentioned DE 10 2006 010 458 A1, which describes the compounder in detail. In order to reduce the residual moisture content of the polymer/fiber material mixes, at least one degassing unit 5 is arranged on the compounder 2. Depending on the type of fiber material, particularly when using wood fibers, the drying occurs in several steps with the degassing units 5 arranged in succession.

The finished, mixed and degassed mix is subsequently conveyed unpressurized through an outlet 23 of the compounder 2 into a connection channel 6, which conveys the mix continuously from the compounder 2 to an agglomerating vessel 11.

The agglomerating vessel 11 consists substantially of a cylindrical container, in which an agglomerating tool 8 is provided immediately below the outlet of the connection channel 6, wherein the transition between the connection channel 6 to the agglomerating vessel 11 and the agglomerating tool 8 is further described in detail with reference to FIG. 3 and FIG. 4.

A cooling tool 10 in the shape of a hollow rotor is mounted centrally in the container, through which a coolant, for example, cooling water, flows from the inside. The rotor here is designed so it has a rotor blade in the radially outer area of the rotor by means of which the finished agglomerate is continuously discharged through a side outlet on the agglomerating vessel 11.

Then, the outlet 12, which is preferably designed as a discharge chute, conveys the agglomerates, for example, by means of a conveyance device, to a reservoir in silo containers. The agglomerates can be removed by dosing from these containers and fed to further processing. Thus, for example, the further processing can take place through a counter-rotating extruder 13, which supplies injection molding machines for the production of molded articles.

As one can see in the detailed representation of the agglomerating tool or of the transition between the connection channel 6 and the agglomerating tool 8, shown in FIG. 3 and FIG. 4, the agglomerating tool 8 of the agglomerating vessel 11 is arranged in the fall direction of the mix below the connection channel 6, and it comprises rotors 81 and stators 82 that engage with each other for producing agglomerates of a predetermined particle size. Here, the stators 82, as can be seen in FIG. 3, are attached to a housing portion of the agglomerating vessel 11, for example, by releasable screw connections. In this manner, the separations between the individual rotors 81 and stators 82 can be modified by leaving out certain individual stators 82.

The rotors 81 are arranged on an axle 83, which protrudes perpendicularly to the stators 82 and to the container wall of the agglomerating vessel 11 into the agglomerating vessel 11, wherein the position of the individual rotors 81 is adjustable in the longitudinal direction of the axle 83. The drive of the axle 83 of the agglomerating tool 8 here occurs by means of a motor arranged outside of said agglomerating vessel 11, wherein the circumferential velocity of the rotors 81 arranged on the axle is approximately 40 m/s, for example, and is modifiable via a frequency converter in the drive unit of the agglomerating tool 8.

As can be seen in FIG. 3, on the end of the connection channel 6 facing the agglomerating vessel 11, an eccentrically adjustable supply chute 7 is arranged, that allows the setting of the position of the impact of the mix with the agglomerating tool 8.

As can be seen clearly in FIG. 4, as a result of the positioning of the supply chute 7 respectively as a result of an eccentric disk 9 attached to the supply chute 7, the mix can be set to certain positions of the agglomerating tool 8, and in that manner, the mix can be divided into agglomerates having different particle sizes. It is important here that the rotors 81 and the stators 82 of the agglomerating tool 8 are designed in such a manner that the fibers of the admixed fiber material are not cut up but are pulled gently at the boundary surface out of their polymer surrounding.

As can be seen in FIG. 5, according to a preferred embodiment variant, a pressure disk 14 is arranged or placed at the tip of one of the screws 221 or 222 of the twin screw 22, based on which tip is close to the connection channel 6. The pressure disk 14 here is preferably placed on the screw 222 of the screw pair 22 that faces away from the outlet. Due to the arrangement of the pressure disk 14 at the tip of the screw 222, an increase in the bulk weight is achieved, particularly in the case of the addition of the additives having a very low bulk weight. The increase in the bulk weight achieved by screening one of the two screw tips allows for a clear increase in the machine throughput. In this embodiment variant, the shearing is not increased markedly, which can be seen in the preservation of the produced fiber lengths.

LIST OF REFERENCE NUMERALS

1 Drive unit
2 Compounder
3 Material inlet
4 Material inlet
5 Degassing unit
6 Connection channel
7 Supply chute
8 Agglomerating tool
9 Eccentric disk
10 Cooling tool
11 Agglomerating vessel
12 Outlet
13 Extruder
14 Pressure disk
21 Housing
22 Twin screw
23 Outlet
81 Rotors
82 Stators
83 Axle
221 Screw
222 Screw

The invention claimed is:

1. A device (1) for producing polymer agglomerates, comprising
a compounder (2) with a housing (21) and a twin screw (22) arranged therein, a plurality of material inlets (3, 4) for the admission of a polymer and additives, tempering units for heating the mix comprising a polymer and additives, at least one degassing unit (5) and an outlet (23),
an agglomerating vessel (11) with an agglomerating tool (8) and with a cooling tool (10), wherein the agglomerating vessel (11) is connected by a connection channel (6) to the outlet (23) of the compounder (2),
which is characterized in that
the twin screw (22) of the compounder (2) is designed as a co-rotating twin screw (22), and
the agglomerating tool (8) of the agglomerating vessel (11) is arranged in the fall direction of the mix below the connection channel (6), and it comprises mutually engaging rotors (81) and stators (82) for producing agglomerates of a defined particle size.

2. The device (1) according to claim 1, characterized in that the rotors (81) and the stators (82) of the agglomerating tool (8) are designed so they can be adjusted for the adaptation of the radial and/or axial separations between the rotors (81) and the stators (82).

3. The device (1) according to claim 1, characterized in that at the end of the connection channel (6) that faces the agglomerating vessel (11), an eccentrically adjustable supply nozzle (7) is arranged by means of which the position of the impact of the mix with the agglomerating tool (8) can be set.

4. The device (1) according to claim 1, characterized in that the twin screw (22) comprises low-shear shearing elements.

5. The device (1) according to claim 1, characterized in that a pressure disk (14) is arranged on a front side of one of the screws (221, 222) of the twin screw (22), with the front side based on which is closer to the connection channel (6).

6. The device (1) according to claim 5, characterized in that the pressure disk (14) is arranged on the screw (221, 222) facing away from the outlet.

7. The device (1) according to claim 1, characterized in that the rpm of the rotors (81) of the agglomerating tool (8) is adjustable.

* * * * *